(12) United States Patent
Bachand

(10) Patent No.: US 10,370,259 B2
(45) Date of Patent: Aug. 6, 2019

(54) BARRIER WITH SUPERHYDROPHOBIC COATING

(75) Inventor: Clyde H. Bachand, Lake Geneva, WI (US)

(73) Assignee: Illinois Tool Works Inc., Glenview, IL (US)

(*) Notice: Subject to any disclaimer, the term of this patent is extended or adjusted under 35 U.S.C. 154(b) by 278 days.

(21) Appl. No.: 14/232,220

(22) PCT Filed: Jul. 10, 2012

(86) PCT No.: PCT/US2012/046074
§ 371 (c)(1),
(2), (4) Date: Jan. 10, 2014

(87) PCT Pub. No.: WO2013/009752
PCT Pub. Date: Jan. 17, 2013

(65) Prior Publication Data
US 2014/0131263 A1      May 15, 2014

Related U.S. Application Data

(60) Provisional application No. 61/506,227, filed on Jul. 11, 2011.

(51) Int. Cl.
*B01D 69/02* (2006.01)
*B01D 71/02* (2006.01)
(Continued)

(52) U.S. Cl.
CPC ............ *C02F 1/003* (2013.01); *B01D 53/228* (2013.01); *B01D 63/087* (2013.01); *B01D 69/02* (2013.01); *B01D 69/10* (2013.01); *B01D 69/12* (2013.01); *B01D 71/02* (2013.01); *B01D 2325/38* (2013.01); *C02F 1/44* (2013.01);
(Continued)

(58) Field of Classification Search
None
See application file for complete search history.

(56) References Cited

U.S. PATENT DOCUMENTS 5,145,752 A     9/1992   Goldstein et al.
5,873,995 A *   2/1999   Huang .................. C02F 1/003
                                                116/284

(Continued)

FOREIGN PATENT DOCUMENTS

WO        00/38845 A1     7/2000
WO     2011001036 A1     1/2011

OTHER PUBLICATIONS

Yuan et al., "Preparation and characterization of self-cleaning stable superhydrophobic linear low-density polyethylene", Sci. Technol. Adv. Mater. 9, (2008) 045007 (5 pp).*

(Continued)

*Primary Examiner* — Jonathan M Peo
(74) *Attorney, Agent, or Firm* — Joseph M. Butscher; The Small Patent Law Group, LLC

(57) ABSTRACT

A barrier of open pore mesh provided with a superhydrophobic coating to prevent wetting when exposed to an aqueous liquid. The disclosed barrier could be a mesh screen or a liquid pervious membrane. The barrier is useful in a filter media containment to permit egress of gas, usually air, from the containment even when subjected to an aqueous liquid containing environment.

14 Claims, 2 Drawing Sheets

(51) Int. Cl.
*B01D 69/10* (2006.01)
*B01D 69/12* (2006.01)
*C02F 1/00* (2006.01)
*B01D 53/22* (2006.01)
*B01D 63/08* (2006.01)
*C02F 1/44* (2006.01)

(52) U.S. Cl.
CPC ......... *C02F 2307/04* (2013.01); *Y10T 442/10* (2015.04); *Y10T 442/218* (2015.04)

(56) References Cited

U.S. PATENT DOCUMENTS

| | | | | |
|---|---|---|---|---|
| 6,012,232 | A * | 1/2000 | Weyrauch | C02F 1/003 34/61 |
| 6,405,875 | B1 | 6/2002 | Cutler | |
| 6,454,941 | B1 * | 9/2002 | Cutler | C02F 1/003 210/266 |
| 7,485,343 | B1 * | 2/2009 | Branson | B05D 3/046 427/230 |
| 2006/0191824 | A1 * | 8/2006 | Arett | A47G 19/12 210/85 |
| 2006/0292345 | A1 * | 12/2006 | Dave | C03C 17/001 428/141 |
| 2007/0141306 | A1 * | 6/2007 | Kasai | B05D 5/08 428/143 |
| 2008/0107864 | A1 * | 5/2008 | Zhang | C04B 41/009 428/141 |
| 2008/0286556 | A1 * | 11/2008 | D'urso | B01D 61/12 428/315.5 |
| 2009/0200215 | A1 * | 8/2009 | Bathula | C02F 1/003 210/85 |
| 2010/0326922 | A1 * | 12/2010 | Varanasi | B01D 17/0211 210/708 |

OTHER PUBLICATIONS

Buckley and Greenblatt, "The Sol-Gel Preparation of Silica Gels", Journal of Chemical Education, vol. 71 (7), 599, 1994, 9 total pages.*
"Silica Sols and Colloidal Silica", Van Nostrand's Scientific Encyclopedia, John Wiley and Sons, Inc., 2006, 4 total pages.*
Fanderlik, Ivan. "Silica Glass and Its Application", Glass Science and Technology 11, Elsevier, published 1991, 4 total pages.*
Wong et al., "Nano-Bio-Electronic Photonic and MEMS Packaging", published by Springer, New York, 2010, pp. 71 & 73, 5 total pages.*
ISR and WO for PCT/US2012/046074 dated Jan. 28, 2013.

* cited by examiner

BARRIER WITH SUPERHYDROPHOBIC COATING

CROSS-REFERENCE TO RELATED APPLICATION

This application is National Phase of PCT/US2012/046074 filed Jul. 10, 2012, and claims the benefit pursuant to Title 35 USC § 119(e) to Provisional Application No. 61/506,227, filed Jul. 11, 2011.

BACKGROUND OF THE INVENTION

This disclosure relates to a barrier comprising an open pore mesh or membrane structure with gaseous flow capability for an environment involving the presence of liquid. More particularly, it relates to an open pore mesh or membrane with gaseous flow capability that is particularly immune to flow impairment in the presence of aqueous liquid.

Various industrial or commercial applications involve handling fluids in a gaseous and/or liquid state. Often, they include selective barriers to fluid flow. That is, process barriers or filters possess the capability to permit passage of gas, such as air, but resist consequences of exposure to liquid such as water. One such configuration involves a filter or barrier that permits passage of gas from a contaminant even though exposed to an environment containing aqueous liquid. This disclosure is directed to such a structure with superior properties to maximize effectiveness.

Open pore mesh configurations are known. Typically, to possess hydrophobic qualities, the pore size must be about 10 microns or less. This configuration is, however, restrictive to air flow. Moreover, it has also been determined that in an environment involving exposure to aqueous liquid, conventional mesh screen tends to "wet" and thereby close the pores of the mesh. That is, the surface tension of the liquid causes it to fill the pores prohibiting passage of gas. In some applications, this problem is particularly prevalent because there is essentially no pressure differential across the barrier to force the gaseous medium through the mesh.

Though numerous and varied applications are contemplated for the structure of the present disclosure, it is illustrated herein with reference to a specific embodiment for which it is considered particularly suitable. It must be understood, however, that the properties of the structure make it suitable for any application involving or dependent upon susceptibility to passage of a gaseous medium, and impervious to the deleterious effect of the presence of an aqueous liquid.

SUMMARY OF DISCLOSURE

The gas pervious barrier of the present disclosure is provided with a superhydrophobic coating to prevent wetting when exposed to an aqueous liquid. The barrier may be a liquid pervious open pore mesh or a membrane. The barrier is useful in a filter media containment to permit egress of gas, usually air, from the containment even when subjected to a liquid containing environment.

DETAILED DESCRIPTION OF ILLUSTRATED EMBODIMENTS

Figure 1:
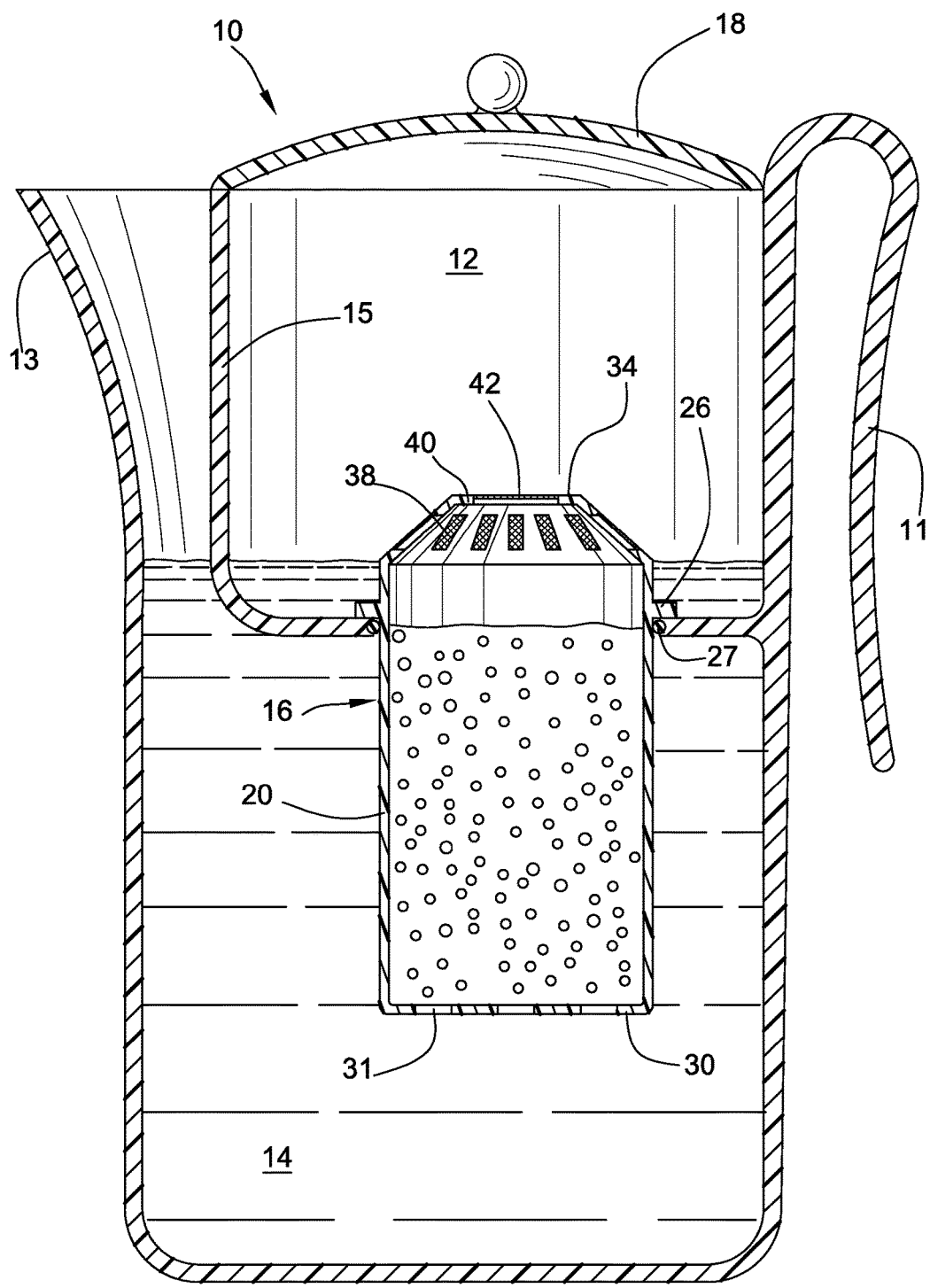
FIG. 1 is a cross-sectional plan view of a water pitcher with a filter assembly illustrative of the principles of the present disclosure.

FIG. 1 is illustrative of the particular application of the structure of the disclosure to a purification media canister. There is illustrated a water pitcher generally designated 10 with a handle 11 and spout 13. It defines separate volumes 12 and 14 separated by a wall 15. Wall 15 includes an aperture that retains a removable purification canister 16. The pitcher 10 includes a liquid inlet to volume 12 closed by removable cover 18. Liquid is discharged from the volume 14 of pitcher 10 at spout 13. The pitcher 10 and its components may be made of molded plastic. Similarly, the purification canister 16 is a plastic containment.

Untreated liquid is poured into volume 12 through the inlet normally closed by cover 18. It passes into volume 14 through purification canister 16. Purified liquid is poured out of volume 14 at spout 13 using handle 11.

Figure 2:
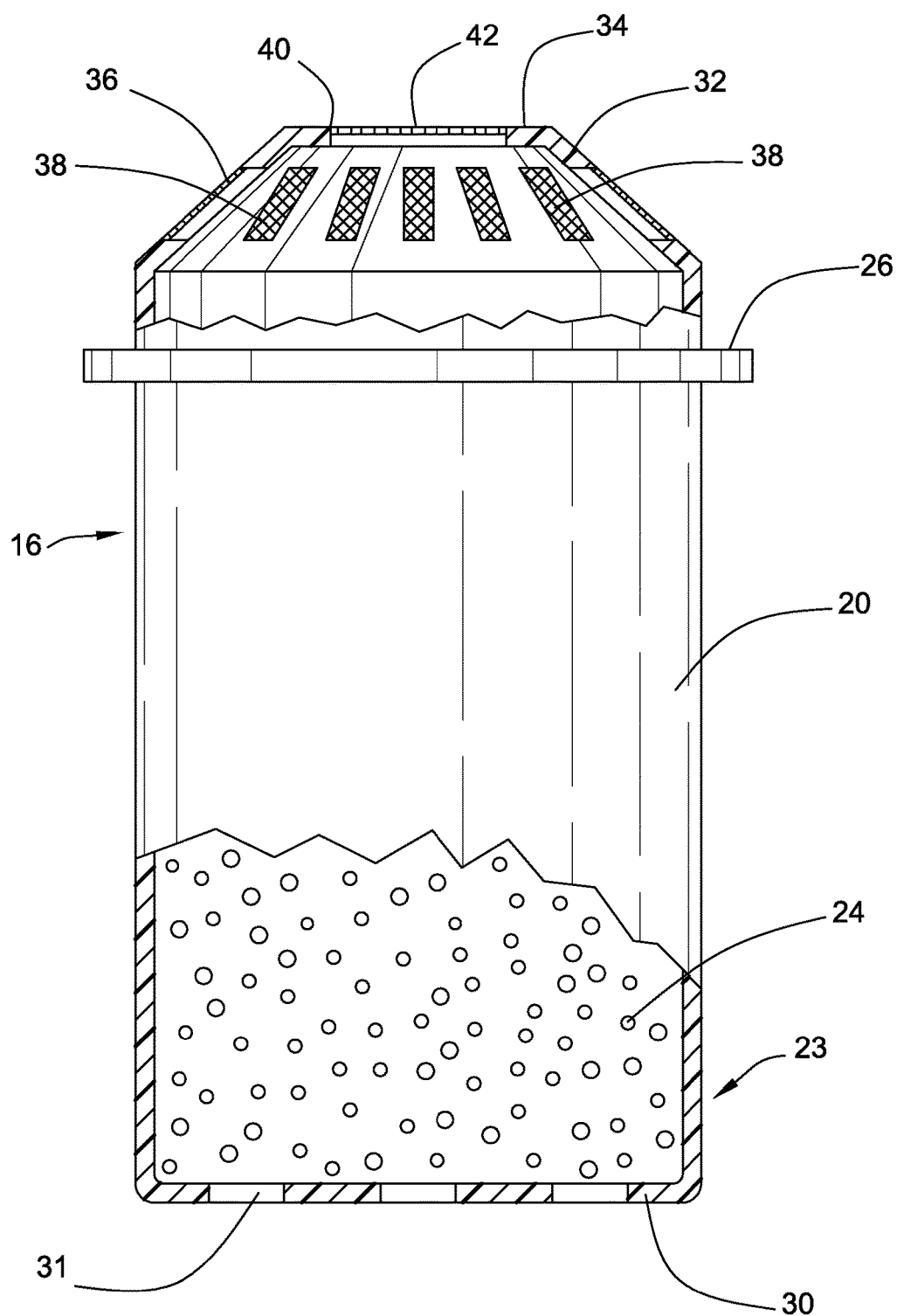
FIG. 2 is a cross-sectional plan view of the filter assembly of the water pitcher of FIG. 1.

Purification canister 16 is illustrated separately in FIG. 2. The canister 16 is elongated and includes generally cylindrical wall 20. It includes an upper or inlet end 22 and a lower, or outlet end 23. It houses a quantity of purification media 24, usually granular activated charcoal.

Cylindrical wall 20 may include a radial flange 26 to limit insertion of purification canister 16 into the aperture in dividing wall 15. A seal ring 27, seen in FIG. 1, may be employed to provide a fluid tight seal between the canister 16 and the dividing wall 15.

Outlet end 23 of canister 16 includes a bottom wall 30 with a plurality of apertures 31 in fluid communication with volume 14 of pitcher 10.

Inlet end 22 of canister 16 includes a truncated conical wall 32 and a circular planar top wall 34. Truncated conical wall 32 includes a plurality of inlet slots 36. Fluid poured into volume 12 is free to pass into purification canister 16 through inlet slots 36. A mesh screen 38 may overlie the slots to prohibit entry of particulate matter or other contaminants and to retain media 24.

Use of pitcher 10 involves filling the pitcher with liquid poured into volume 12. The poured liquid, usually water, passes through the inlet slots 36 and mesh screen 38 into purification canister 16. The liquid passes through the media 24 and through apertures 31 in bottom wall 30 and into volume 14.

It has been determined that meaningful quantities of gas, usually air, are entrained in the liquid, or created by turbulent flow associated with the filing function or released by media 24. It is also deemed desirable to purge the air from the canister as it often impacts the flow through the filter 16. Toward this objective circular planar top wall 34 is provided with a central or vent opening 40. As illustrated, the opening 40 is covered with a treated mesh screen 42 that permits gases within the upper end of canister 16 to escape into volume 12, maximizing usefulness of the purification canister.

In accordance with the present disclosure, the mesh screen 42 includes a coating on its exterior surface of superhydrophobic material. Screen 42 may be insert molded, heat staked, or ultrasonically sealed or otherwise associated with the planar top wall 34. The superhydrophobic coating on mesh screen 42 may be applied by any suitable means, such as, for example, by spin-coating, ink jet printing, blade casting, dip coating, or aerosol spraying prior to, or after, assembly.

The superhydrophobic coating renders the mesh 42 resistant to "wetting" or pore closure due to liquid surface tension. With the central opening in top wall 40 and treated mesh screen 42 in place, air within the purification canister 16 is free to pass through the pores of the treated mesh screen 42. Because of the presence of the superhydrophobic layer on the surface of the mesh 42 exposed to the volume 12 of pitcher 10 liquid within the volume 12 or liquid that splashes onto mesh 42 during the filling function is prevented from wetting the mesh material. Accordingly, the pores of the mesh remain open and air may readily purge from canister 16.

Useful alternatives to the mesh include other forms of filter media such as woven screen, non-woven screen, or membrane. It is contemplated that satisfactory performance can be achieved with a superhydrophobic coated mesh having a coating of thickness of less than 200 nanometers.

Superhydrophobic coating material is available from Lotus Leaf Coatings, a New Mexico-headquartered corporation licensed to commercialize superhydrophobic coatings developed at Sandia National Laboratory and the University of New Mexico. The coating is made up of amorphous silica and a custom engineered polymer that does not contain fluorine or per-fluoro compounds. The coating from Lotus Leaf Coatings is described in U.S. Pat. No. 7,485,343, issued Feb. 3, 2009, entitled "Preparation of Hydrophobic Coatings." The entire disclosure is hereby incorporated herein by reference as if fully set forth herein. The material contemplated will provide a contact angle of a water droplet typically exceeding 150° with a roll off angle of less than 10°.

Use of a mesh with a superhydrophobic coating permits use of larger mesh sizes, around 40 microns or larger. Such screens or membrane will perform effectively even with the larger pore or mesh opening size. It has been found that a coated vent 40 with a screen 42 having a mesh the size of 160 microns works effectively.

It is recognized that air could under ideal circumstances escape canister 16 through inlet slots 36. This path, however, is subject to random closure by quantities of water being poured into volume 12. This disclosure illustrates the advantages of a separate air passage at central opening 40 in planar top wall 34. Moreover, it further discloses means to maximize the advantage of such a separate path through provision of a layer or coating of superhydrophobic material on the mesh or membrane installed in the opening to contain the contents of canister 16.

The foregoing example is only one application of the arrangement described. It is contemplated that open pore mesh screen or membrane coated with a superhydrophobic layer has numerous applications where passage of a gas through the open pore structure is facilitated even in the presence of a liquid containing environment. Examples contemplated include medical filtration or delivery systems, food processing, industrial filtration and other environments.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A canister comprising:
   a housing having a fluid inlet to receive a fluid into the canister and a fluid outlet through which the fluid exits the canister, the housing also including a vent separate from and spaced apart from the fluid inlet for egress of a gaseous medium from the housing, wherein the fluid inlet and the vent are positioned in the housing such that both the fluid inlet and the vent come into contact with the fluid when the fluid is received into the canister through the fluid inlet; and
   a gas pervious barrier disposed over the vent, the gas pervious barrier comprising a mesh or a membrane coated with a superhydrophobic coating, the superhydrophobic coating consisting essentially of amorphous silica and a polymer that does not contain fluorine or per-fluoro compounds, wherein the mesh or membrane that is coated with the superhydrophobic coating defines open pores through which the gaseous medium flows through the mesh or membrane.

2. The canister of claim 1, wherein the superhydrophobic coating has a thickness of less than 200 nanometers.

3. The canister of claim 1, wherein the superhydrophobic coating has a water droplet contact angle of at least 150°.

4. The canister of claim 1, wherein the superhydrophobic coating has a water droplet roll-off angle of less than 10°.

5. The canister of claim 1, wherein the gas pervious barrier has a mesh size exceeding ten (10) microns.

6. The canister of claim 1, further comprising a mesh screen disposed over the fluid inlet, wherein the fluid that is received into the canister is configured to flow through the mesh screen.

7. A canister comprising:
   a housing having an inlet through which a fluid is received into the housing, the housing also including a vent having a superhydrophobic coated gas pervious barrier with one or more pores through which gas exits from the housing,
   wherein the inlet and the vent are positioned in the housing such that both the inlet and the vent come into contact with the fluid when the fluid is received into the housing through the inlet, and
   wherein the superhydrophobic coated gas pervious barrier prevents closure of the one or more pores by the fluid while allowing the gas to exit the housing.

8. The canister of claim 7, wherein the housing includes one or more apertures through which the fluid exits from the housing.

9. The canister of claim 7, wherein the superhydrophobic coated gas pervious barrier has a superhydrophobic coating.

10. The canister of claim 9, wherein the superhydrophobic coating consists essentially of amorphous silica and a polymer that does not contain fluorine or per-fluoro compounds.

11. The canister of claim 9, wherein the superhydrophobic coating has a thickness of less than 200 nanometers.

12. The canister of claim 9, wherein the superhydrophobic coating has a water droplet contact angle of at least 150°.

13. The canister of claim 9, wherein the superhydrophobic coating has a water droplet roll-off angle of less than 10°.

14. The canister of claim 7, further comprising a mesh screen disposed over the inlet, wherein the fluid that is received into the canister is configured to flow through the mesh screen.

* * * * *